US010184410B2

(12) United States Patent
De Filippo (10) Patent No.: US 10,184,410 B2
(45) Date of Patent: Jan. 22, 2019

(54) METHOD OF OPERATING A LOW PRESSURE EGR VALVE IN A LOW PRESSURE EGR ROUTE OF AN INTERNAL COMBUSTION ENGINE (71) Applicant: GM GLOBAL TECHNOLOGY OPERATIONS LLC, Detroit, MI (US)

(72) Inventor: Andrea De Filippo, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 69 days.

(21) Appl. No.: 15/189,841

(22) Filed: Jun. 22, 2016

(65) Prior Publication Data

US 2016/0377006 A1 Dec. 29, 2016

(30) Foreign Application Priority Data

Jun. 23, 2015 (GB) .................... 1511034.9

(51) Int. Cl.
*F01N 3/035* (2006.01)
*F01N 3/20* (2006.01)
(Continued)

(52) U.S. Cl.
CPC ......... *F02D 41/0077* (2013.01); *F01N 3/035* (2013.01); *F01N 3/2066* (2013.01); *F01N 9/002* (2013.01); *F02D 41/0055* (2013.01); *F02D 41/029* (2013.01); *F02D 41/1446* (2013.01); *F02M 26/05* (2016.02); *F02M 26/06* (2016.02); *F01N 3/0842* (2013.01); *F01N 3/0885* (2013.01); *F01N 13/009* (2014.06); *F01N 2560/06* (2013.01); *F01N 2560/08* (2013.01); *F01N 2560/14* (2013.01); *F01N 2610/02* (2013.01); *F01N 2900/08* (2013.01);

(Continued)

(58) Field of Classification Search
CPC ........ F01N 3/035; F01N 3/2066; F01N 9/002; F01N 13/009; F01N 2560/06; F01N 2560/08; F01N 2560/14; F01N 2610/02; F01N 2900/08; F01N 2900/1404; F02D 41/0055; F02D 41/0077; F02D 41/029; F02D 41/1446; F02M 26/05; F02M 26/06
See application file for complete search history.

(56) References Cited

U.S. PATENT DOCUMENTS 5,848,580 A * 12/1998 Mashiki .................. F02D 21/08
123/295
2013/0186376 A1* 7/2013 Peters ................. F02D 41/0065
123/568.2

FOREIGN PATENT DOCUMENTS

JP        2014148908 A  *  8/2014

OTHER PUBLICATIONS

Machine Translation of JP 2014148908 A to Sakurai et. al.*
Great Britain Patent Office, Great Britain Search Report for Great Britain Application No. 1511034.9, dated Dec. 1, 2015.

* cited by examiner

*Primary Examiner* — Brandon Lee
(74) *Attorney, Agent, or Firm* — Lorenz & Kopf, LLP (57) ABSTRACT A method is disclosed for operating a low pressure EGR valve in a low pressure EGR route of an internal combustion engine equipped with an aftertreatment system having a urea injector upstream of a Selective Catalytic Reduction on Filter (SCRF). During a regeneration procedure of the SCRF, an enabling condition is monitored for opening the low pressure EGR valve of the low pressure EGR route when enabling condition is satisfied. The enabling condition may be satisfied if a urea injection is not performed.

12 Claims, 4 Drawing Sheets (51) Int. Cl.
*F02D 41/00* (2006.01)
*F01N 9/00* (2006.01)
*F02M 26/05* (2016.01)
*F02M 26/06* (2016.01)
*F02D 41/02* (2006.01)
*F02D 41/14* (2006.01)
*F01N 3/08* (2006.01)
*F01N 13/00* (2010.01)

(52) U.S. Cl.
CPC .............. *F01N 2900/1404* (2013.01); *F02D 2200/101* (2013.01); *Y02T 10/24* (2013.01); *Y02T 10/47* (2013.01)

METHOD OF OPERATING A LOW PRESSURE EGR VALVE IN A LOW PRESSURE EGR ROUTE OF AN INTERNAL COMBUSTION ENGINE

CROSS-REFERENCE TO RELATED APPLICATION

This application claims priority to Great Britain Patent Application No. 1511034.9, filed Jun. 23, 2015, which is incorporated herein by reference in its entirety.

TECHNICAL FIELD

The present disclosure pertains to a method of operating a low pressure EGR valve in a low pressure Exhaust Gas Recirculation (EGR) route of an internal combustion engine.

BACKGROUND

Internal combustion engines, and in particular Diesel engines, are known to be equipped with exhaust gas aftertreatment systems. Aftertreatment systems treat exhaust gases that exit the combustion chamber and that are directed into an exhaust pipe having one or more aftertreatment devices configured to filter and/or change the composition of the exhaust gases. For example, aftertreatment devices may include an Oxidation Catalyst (DOC), a Diesel Particulate Filter (DPF), a Lean $NO_x$ Trap (LNT), a Selective Catalytic Reduction (SCR) system, a SCRF (SCR on Filter) or combinations thereof.

Exhaust Gas Recirculation (EGR) is also a known $NO_x$ emission control technique applicable to a wide range of diesel engines. The configuration of an EGR system depends on the current legal requirements expressed in terms of required EGR rate vs engine operating area and on EGR system costs and packaging constraints. Advanced EGR systems include a high pressure EGR conduit which fluidly connects the exhaust manifold with the intake manifold, and a low pressure EGR conduit which fluidly connects the exhaust line downstream the DPF to the intake line upstream the intake manifold.

While the high pressure EGR conduit defines a short route for the exhaust gas recirculation, the low pressure EGR conduit defines a long route which also includes a relevant portion of the exhaust line and a relevant portion of the intake line. In this way, the long route EGR (LRE) is effective for routing back to the intake manifold exhaust gas having lower temperature than those routed back by the short route EGR (SRE). The usage of the Low Pressure EGR is currently limited when the exhaust gas temperature downstream of the filter is high, as for example during or soon after a DPF/SCRF regeneration and a LNT desulphation process.

As is known in the art, a LNT desulphation process, also known as a $DeSO_x$ regeneration event, is performed by several rich combustion phases executed at high temperature, where gas temperature in the LNT may be around 650° C. Each rich combustion phase being followed by a lean combustion phase, whereby this lean-to-rich-to-lean approach is also referred as wobbling approach. In these conditions the exhaust gas temperature might reach values higher than 400° C. and the recirculation of these exhaust gas stream might cause severe problems to the EGR valve since its structural limit is 180° C. as maximum temperature, and dependent on the technology chosen.

SUMMARY

The present disclosure provides more flexibility for the use of the low pressure EGR route in regeneration mode, while at the same time reducing $NO_x$ emissions in regeneration mode. The present disclosure also allows better control of temperature in order to guarantee the safety of the low pressure EGR valve.

An embodiment of the disclosure provides a method of operating a low pressure EGR valve in a low pressure EGR route of an internal combustion engine equipped with an aftertreatment system including a urea injector upstream of a Selective Catalytic Reduction on Filter (SCRF). A regeneration procedure of the SCRF is performed. During the regeneration procedure of the SCRF, an enabling condition for opening the low pressure EGR valve of the low pressure EGR route is monitored. The low pressure EGR valve is opened when an enabling condition indicating that a urea injection is not performed is satisfied.

An effect of this embodiment is that it allows use of the low pressure EGR route in regeneration mode, while at the same time reducing $NO_x$ emissions in regeneration mode and an improved control of temperature in order to guarantee the safety of the low pressure EGR valve. This embodiment allows for a reduced calibration effort to meet emissions requirements. In contrast with a continuous use of the low pressure EGR route, this embodiment also allows for a higher safety in respect to EGR route clogging in case of damaged DPF or of slippage of $HC/NH_3$ from the SCRF.

According to another embodiment of the present disclosure, the enabling condition is monitored based on an engine speed and an engine load and the enabling condition is satisfied if the engine speed and the engine load are greater than respective thresholds thereof. An effect of this embodiment is that, since at low engine speed and low engine loads the overall benefits of a low pressure EGR valve usage are lower to identify proper condition to operate the EGR valve.

According to another embodiment of the present disclosure, if the enabling condition is satisfied, the low pressure EGR valve is opened and closed intermittently. An effect of this embodiment is that it avoids the risk connected to a continuous use of the low pressure EGR valve.

According to a further embodiment of the present disclosure, the operation of the low pressure EGR valve includes the opening of the valve for a constant period of time. An effect of this embodiment is that it provides a simple and effective technique to operate intermittently the low pressure EGR valve, also allowing for an improved control of the temperature of the valve.

According to still another embodiment of the present disclosure, the operation of the low pressure EGR valve includes the opening of the valve for a constant percentage of aperture. An effect of this embodiment is that it provides a simple and effective technique to operate intermittently the low pressure EGR valve.

According to another embodiment of the present disclosure, the operation of the low pressure EGR valve includes the opening of the valve for a period of time that is variable as a function of an SCRF inlet temperature. An effect of this embodiment is that it provides a flexible and effective technique to operate intermittently the low pressure EGR valve, also allow allowing for an improved control of the temperature of the valve.

According to still another embodiment of the present disclosure, the variable period of aperture of the low pressure EGR valve is determined by means of a predetermined function of the ratio between the SCRF inlet temperature and a predefined maximum temperature of the low pressure EGR valve. An effect of this embodiment is that it provides a way to operate the valve within its structural limits.

According to another embodiment of the present disclosure, the variable period of aperture of the low pressure EGR valve is terminated if the ratio between the SCRF inlet temperature and a predefined maximum temperature of the low pressure EGR valve differs from the predetermined function by less than a predefined amount. An effect of this embodiment is that it provides a guarantee that a maximum valve temperature is not exceeded.

Another aspect of the present disclosure provides an apparatus for operating a low pressure EGR valve in a low pressure EGR route of an internal combustion engine, the engine being equipped with an aftertreatment system including a urea injector upstream of a Selective Catalytic Reduction on Filter (SCRF), the apparatus includes an electronic control unit configured to monitor an enabling condition for opening the low pressure EGR valve of the low pressure EGR route during a regeneration procedure of the SCRF, and open the low pressure EGR valve, if the enabling condition is satisfied, The enabling condition may be satisfied when a urea injection is not performed. An effect of this aspect is that it allows use of the low pressure EGR route in regeneration mode, while at the same time reducing $NO_x$ emissions in regeneration mode and an improved control of temperature in order to guarantee the safety of the low pressure EGR valve. Moreover, this aspect allows for a reduced calibration effort to meet emissions requirements and, in contrast with a continuous use of the low pressure EGR route, this aspect allows for a higher safety in respect to EGR route clogging in case of damaged DPF or of slippage of $HC/NH_3$ from the SCRF.

According to another aspect of the present disclosure, the apparatus includes a low pressure EGR valve temperature sensor. An effect of this aspect is to provide a way to measure in real time the temperature of the low pressure EGR valve.

According to another aspect of the present disclosure, the electronic control unit is configured to monitor a mission profile as a function of engine speed and engine load. The enabling condition is satisfied when the engine speed and the engine load are greater than respective thresholds thereof. An effect of this aspect is that, since at low engine speed and low engine loads the overall benefits of a low pressure EGR valve usage are lower to identify proper condition to operate the EGR valve.

According to another aspect of the present disclosure, the apparatus is configured to open and close the low pressure valve intermittently, if the enabling condition is satisfied. An effect of this aspect is that it avoids the risk connected to a continuous use of the low pressure EGR valve.

According to a further aspect of the present disclosure, the apparatus is configured to open the valve for a constant period of time. An effect of this aspect is that it provides a simple and effective technique to operate intermittently the low pressure EGR valve.

According to still another aspect of the present disclosure, the apparatus is configured to open of the valve for a constant percentage of aperture. An effect of this aspect is that it provides a simple and effective technique to operate intermittently the low pressure EGR valve.

According to another aspect of the present disclosure, the apparatus is configured to open of the valve for a period of time that is variable as a function of an SCRF inlet temperature. An effect of this aspect is that it provides a flexible and effective technique to operate intermittently the low pressure EGR valve, also allow allowing for an improved control of the temperature of the valve.

According to still another aspect of the present disclosure, the apparatus is configured to determine the variable period of aperture of the low pressure EGR valve using a predetermined function of the ratio between the SCRF inlet temperature and a predefined maximum temperature of the low pressure EGR valve. An effect of this aspect is that it provides a way to operate the valve within its structural limits.

According to another aspect of the present disclosure, the apparatus is configured to terminate the variable period of aperture of the low pressure EGR valve, if the ratio between the SCR inlet temperature and a predefined maximum temperature of the low pressure EGR valve differs from the predetermined function by less than a predefined amount. An effect of this aspect is that it provides a guarantee that a maximum valve temperature is not exceeded.

The method according to one of its aspects can be carried out with the help of a computer program including a program-code for carrying out the method described above, and in the form of computer program product including the computer program. The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
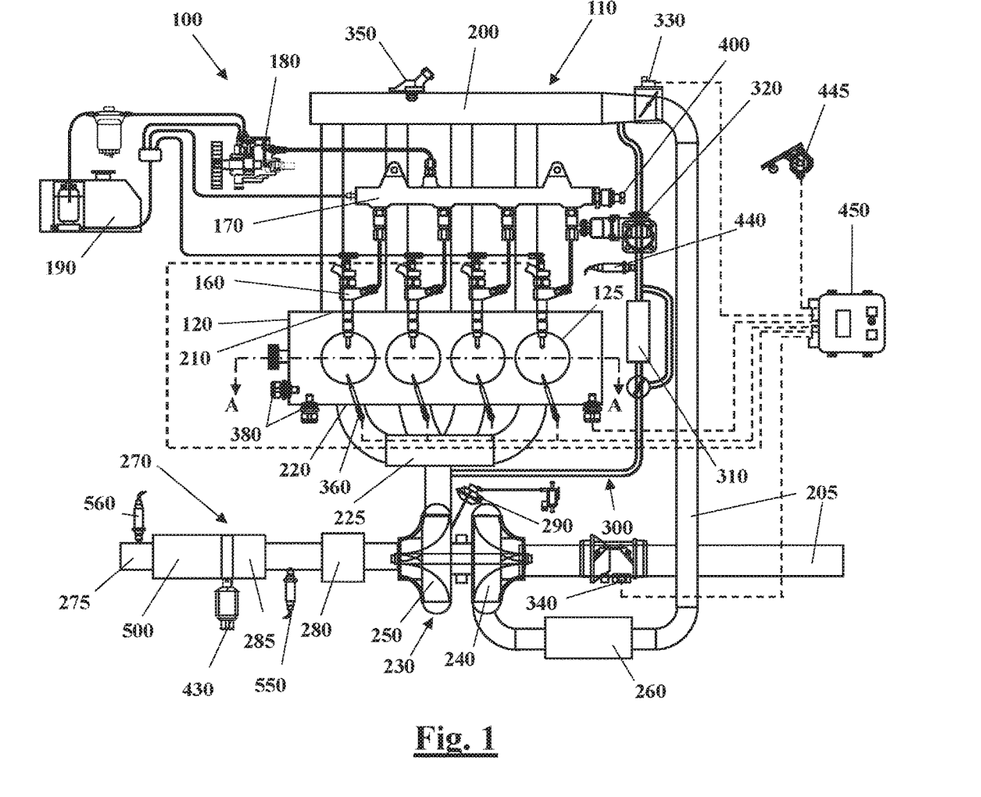
FIG. 1 shows an automotive system.
Figure 2:
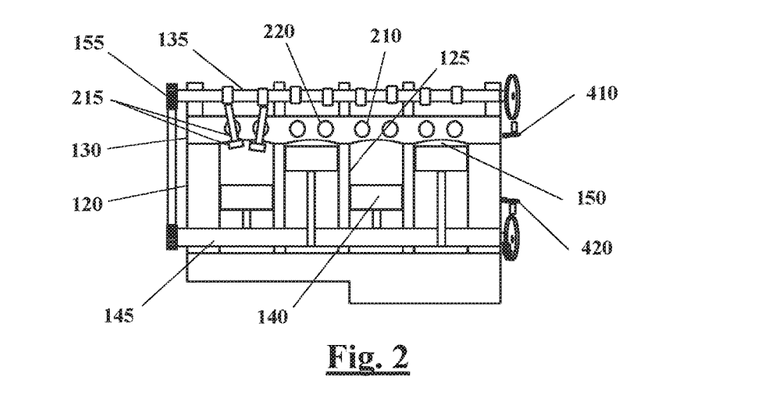
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters, such as a Selective Catalytic Reduction on Filter (SCRF) 500. The SCRF 500 may be associated with a temperature sensor upstream of the SCRF 500 and temperature sensor downstream of the SCRF 560.

Other embodiments may include a high pressure exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300. Other embodiments may include also a low pressure exhaust gas recirculation (EGR) system 600 better explained hereinafter with reference to FIG. 3.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
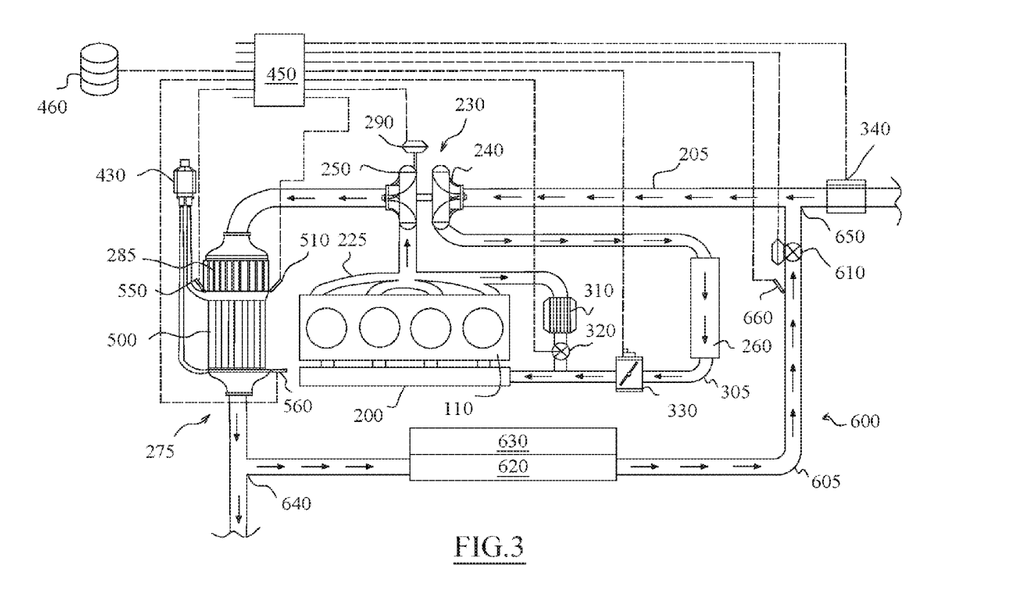
FIG. 3 shows some details of the automotive system of FIG. 1.

FIG. 3 represents a portion of the automotive system 100 of FIGS. 1-2 wherein, in the exhaust pipe 275, a Selective Catalytic Reduction on Filter (SCRF) 500 is provided, the SCRF 500 being placed downstream of a Lean $NO_x$ Trap (LNT) 285. A temperature sensor upstream of the SCRF 550 and a temperature sensor downstream of the SCRF 560 are also provided. The SCRF 500 is associated with a urea injector 510, which is located in the exhaust pipe 275, upstream of the SCRF 500, for injecting a Diesel Exhaust Fluid (DEF), in this case urea ($CH_4N_2O$), in the exhaust gas stream. Due to thermo-hydrolysis reactions occurring inside the exhaust pipe 275, urea is converted into a gaseous reducing agent, typically ammonia ($NH_3$), which is absorbed inside the SCR portion of the SCRF 500, so as to promote $NO_x$ reduction reactions. Urea is contained in a urea tank and reaches the urea injector 510 through a urea pipe (both urea tank and pipe not being represented for simplicity). The injections of urea are commanded by the ECU 450, according to engine operating conditions or other parameters.

In the FIG. 3, the Exhaust Gas Recirculation (EGR) system is also represented. The EGR system includes a high pressure EGR conduit 305 for directly fluidly connecting the exhaust manifold 225 with the intake manifold 200, a high pressure EGR cooler 310 for cooling the exhaust gas, and a high pressure electrically controlled valve 320 for determining the flow rate of exhaust gas through the high pressure EGR conduit 305. The high pressure EGR conduit 305 defines a short route for the exhaust gas recirculation cooler, so that the exhaust gas routed back by the high pressure EGR conduit 305 is quite hot. The EGR system further include a low pressure EGR conduit 605, which fluidly connects a branching point 640 of the exhaust line 275, downstream of the SERF 500, with a leading point 650 of the intake line 205 upstream the compressor 240 of turbocharger 230, and a low pressure EGR cooler located in the a low pressure EGR conduit 605, the low pressure EGR cooler including a portion 620 for the exhaust gas and a portion 630 for the coolant.

The flow rate of exhaust gas through the low pressure EGR conduit 605 is determined by an electrically controlled low pressure EGR valve 610, wherein the valve 610 is located in a low pressure EGR conduit 605 downstream of the low pressure EGR cooler. A low pressure EGR valve temperature sensor 660 may be placed close to the low pressure EGR valve 610 to measure a temperature thereof. The low pressure EGR conduit 605 defines a long route for the exhaust gas recirculation, which includes also the portion of the exhaust line 275 included between the exhaust manifold 225 and the branching point 640, and the portion of the intake line 205 included between the leading point 650 to the intake manifold 200.

Flowing along the long route, the exhaust gas is forced to pass through the turbine 250 of turbocharger 230, the LNT 285, the SCRF 500, the low pressure EGR cooler, the compressor 240 of turbocharger 230, so that it become considerably colder than the exhaust gas which flows through the high pressure EGR conduit 305, to thereby reaching the intake manifold at a lower temperature. As stated above, exhaust gas flow through the low pressure EGR conduit 605 is controlled by operating the low pressure EGR valve 610.

According to an embodiment of the present disclosure, the method is initiating during a SCRF regeneration. During the SCRF regeneration, SCRF inlet $T_{SCRFin}$ and SCRF outlet $T_{SCRFout}$ temperature values are obtained, for example by measurement by means of the respective sensors, namely using the temperature sensor upstream of the SCRF 550 and the temperature sensor downstream of the SCRF 560. An enabling condition to operate the low pressure EGR valve 610 of the low pressure EGR route 600 is also monitored during the SCRF regeneration and, if such enabling condition is satisfied, the low pressure EGR valve 610 is opened. A preferred way to operate the low pressure EGR valve 610 is to operate it intermittently.

Monitoring the enabling condition to open the low pressure vale 601 during a SCRF regeneration may include monitoring the injection of urea upstream of the SCRF 500, or the mission profile expressed in terms of engine speed $E_{speed}$ and engine load $E_{load}$ or a combination of the above criteria. According to an embodiment of the present disclosure, the enabling condition is satisfied if a urea injection is not performed. According to an embodiment of the present disclosure, the step of monitoring the enabling condition includes monitoring an engine speed $E_{speed}$ and an engine load $E_{load}$, the enabling condition being satisfied if the engine speed $E_{speed}$ and the engine load $E_{load}$ are greater than respective thresholds thereof $E_{speedTH}$, $E_{loadTH}$. As soon as an enabling condition to operate the low pressure EGR valve 610 is satisfied, the valve 610 is opened intermittently, according to several alternative strategies hereinafter described.

A first strategy is described with reference to FIG. 4 which is a graph representing a first embodiment of a method of operating the low pressure EGR valve 610. In this case, the operation of the low pressure EGR valve 610 includes the opening of the valve 610 for a constant period of time. Moreover, the operation of the low pressure EGR valve 610 includes the opening of the valve 610 for a constant percentage of aperture. The interval of time between two successive apertures of the low pressure EGR valve 610 may also be constant and can be calibrated by means of an experimental activity. As an example, some automotive systems may require a constant period of time of aperture of 20 s and a constant percentage of aperture of the valve 610 of 30%. Other automotive systems may require different values thereof. A criterion to choose the best percentage value of valve aperture is to monitor valve 610 temperature and, at the same time, monitor engine out emission which increase as a function of valve aperture percentage.

A second strategy is described with reference to FIG. 5. This second strategy includes the opening of the valve 610 for a period of time that is variable as a function of an SCRF inlet temperature $T_{SCRFin}$. For implementing this second strategy a threshold function (expressed by curve B in FIG. 5) is defined in terms of the ratio between the SCRF inlet temperature $T_{SCRFin}$ and a predefined maximum temperature $T_{ValveMax}$ of the low pressure EGR valve 610. Then the actual ratio between the SCRF inlet temperature and a predefined maximum temperature of the low pressure EGR valve 610 is monitored (curve A in FIG. 5) and is compared with the threshold function (Curve B in FIG. 5) and the valve 610 is kept open. The variable period of aperture of the low pressure EGR valve 610 is terminated if the ratio between the SCRF inlet temperature $T_{SCRFin}$ and a predefined maximum temperature $T_{ValveMax}$ of the low pressure EGR valve 610 differs from the predetermined function by less than a predefined amount $\Delta T$. The predefined amount $\Delta T$ can also be set to zero. Also in this case, the operation of the low pressure EGR valve 610 may include the opening of the valve 610 for a constant percentage of aperture.

In all embodiments described, the values of the percentage of aperture of the valve 610 can be calibrated by means of an experimental activity.

Figure 6:
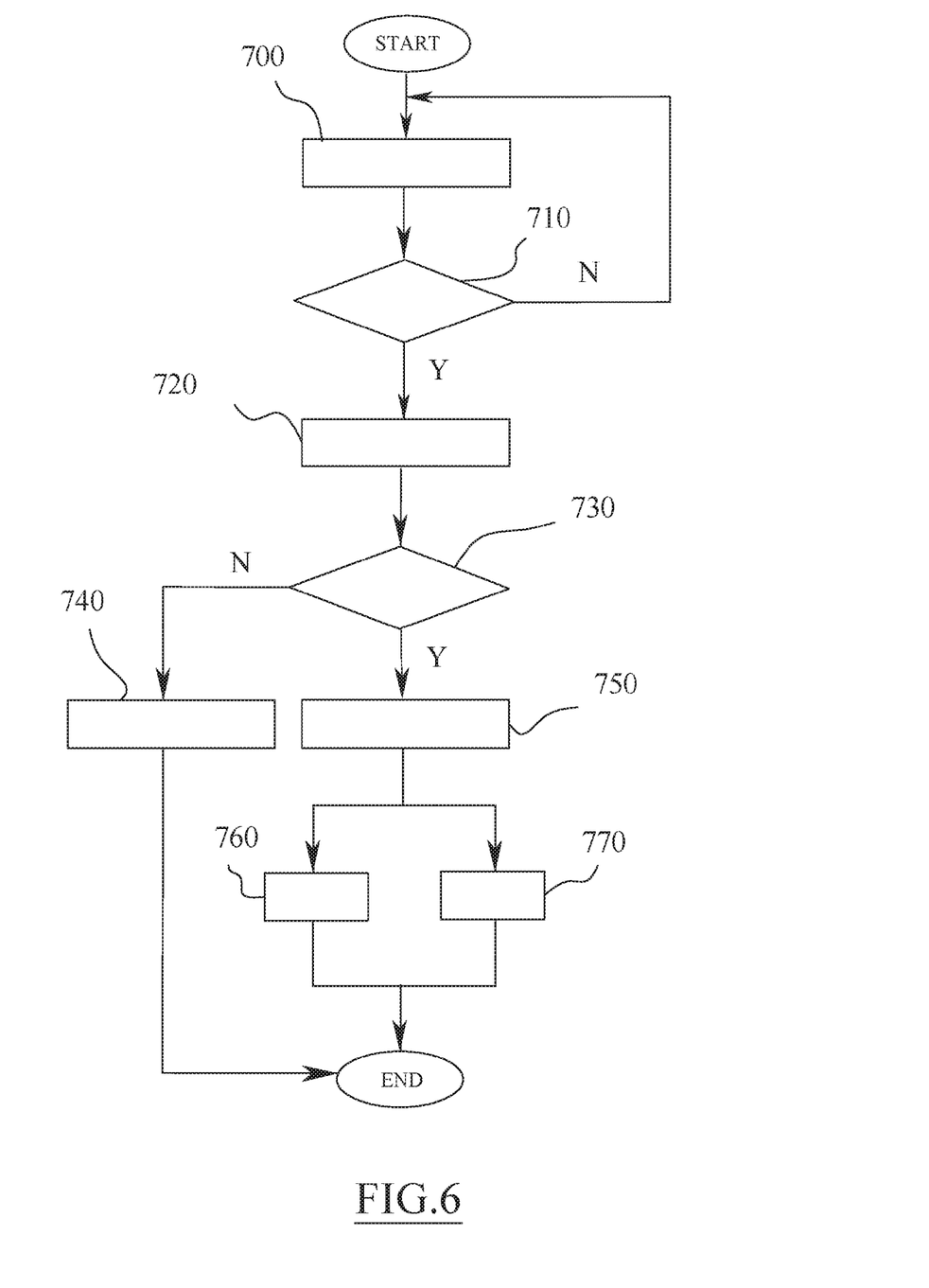
FIG. 6 is a flowchart representing an embodiment of the present disclosure.

FIG. 6 is a flowchart representing an embodiment of the present disclosure.

The method may check to verify if a SCRF regeneration is active (block 700). In the alternative, the method may check to verify if a $DeSO_x$ regeneration of the LNT 285 is active can be performed. If the answer to the check is negative (block 710), the method is recycled and a subsequent check is performed (block 700).

Figure 4:
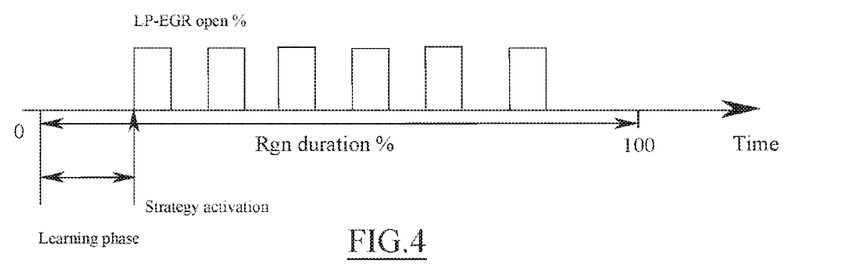
FIG. 4 is a graph representing a first embodiment of a method of operating a low pressure EGR valve of a low pressure EGR route.
Figure 5:
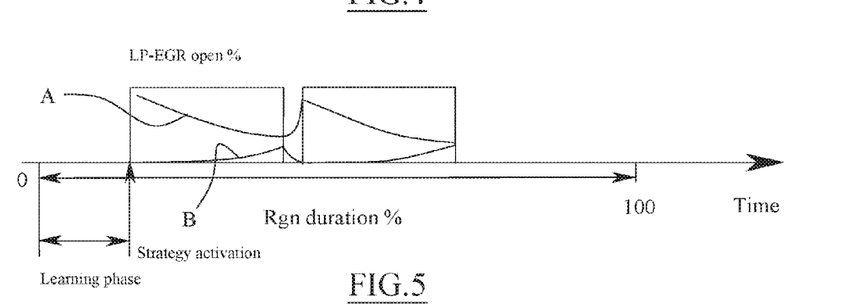
FIG. 5 is a graph representing a second embodiment of a method of operating a low pressure EGR valve of a low pressure EGR route.

If the answer to the check is positive (block 710), the enabling conditions are monitored (block 720), a step also referred as learning phase in FIGS. 4 and 5. If the enabling condition are not verified (block 730), then the regeneration is continued in a standard fashion (block 740). On the contrary, if the enabling condition is verified (block 730), then the low pressure EGR valve 610 is operated (block 750). The low pressure EGR valve 610 can operated according to the constant time of aperture strategy describe in connection with FIG. 4 (block 760) or, in the alternative, according to the temperature based strategy described in connection with FIG. 5 (block 770).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

I claim:

1. A method of operating a low pressure EGR valve_ defining a flow aperture in a low pressure EGR route of an internal combustion engine having an aftertreatment system including a urea injector upstream of a Selective Catalytic Reduction on Filter (SCRF), the method comprising:
    monitoring an enabling condition including an engine speed and an engine load to determine when the engine speed and the engine load are greater than respective thresholds thereof during a regeneration procedure of the SCRF;
    intermittently opening the low pressure EGR valve when the engine speed and the engine load are greater than respective thresholds thereof and when a urea injection is not performed during the regeneration procedure; and
    opening the low pressure EGR valve for a period of time as a function of an SCRF inlet temperature; and further comprising determining a variable period of aperture of the low pressure EGR valve based on a threshold function of the ratio between the SCRF inlet temperature and a predefined maximum temperature of the low pressure EGR valve.

2. The method according to claim 1, wherein opening the low pressure EGR valve further comprises intermittently opening the low pressure EGR valve for constant periods of time.

3. The method according to claim 1, wherein opening the low pressure EGR valve further comprises intermittently opening the low pressure EGR valve to a constant percentage of aperture.

4. The method according to claim 1, further comprising terminating the variable period of aperture of the low pressure EGR valve when the ratio between the SCRF inlet temperature and a predefined maximum temperature of the low pressure EGR valve differs from the threshold function by less than a predefined amount.

5. A non-transitory computer readable medium comprising a computer program having a computer-code, which when executed on a processor performs the method according to claim 1.

6. A control apparatus for an internal combustion engine comprising an electronic control unit, a memory associated with the electronic control unit and a computer program having a computer-code, which when executed on the electronic control unit is configured to:
    monitor an enabling condition including an engine speed and an engine load to determine when the engine speed and the engine load are greater than respective thresholds thereof during a regeneration procedure of a SCRF; and
    opening the low pressure EGR valve if the enabling condition is satisfied during the regeneration procedure, wherein the enabling condition is satisfied when a urea injection is not performed; and
    wherein the electronic control unit is configured to intermittently open and close the low pressure EGR valve when the enabling condition is satisfied, and the electronic control unit is configured to open the low pressure EGR valve for a period of time as a function of an SCRF inlet temperature, and to determine the variable period of aperture of the low pressure EGR valve based on a threshold function of the ratio between the SCRF inlet temperature and a predefined maximum temperature of the low pressure EGR valve.

7. The control apparatus according to claim 6, wherein the electronic control unit is configured to monitor an engine speed and an engine load, the enabling condition being satisfied when the engine speed and the engine load are greater than respective thresholds thereof.

8. The control apparatus according to claim 6, wherein the electronic control unit is configured to intermittently open the low pressure EGR valve for a constant periods of time.

9. The control method according to claim 6, wherein the electronic control unit is configured to open the low pressure EGR valve for a constant percentage of aperture.

10. The control apparatus according to claim 6, wherein the electronic control unit is configured to terminate the variable period of aperture of the low pressure EGR valve when the ratio between the SCRF inlet temperature and a predefined maximum temperature of the low pressure EGR valve differs from the threshold function by less than a predefined amount.

11. The control apparatus according to claim 6, wherein the apparatus further comprises a low pressure EGR valve temperature sensor.

12. A method of operating a low pressure EGR valve defining a flow aperture in a low pressure EGR route of an internal combustion engine having an aftertreatment system including a urea injector upstream of a Selective Catalytic Reduction on Filter (SCRF), the method comprising:
    monitoring an enabling condition including an engine speed and an engine load to determine when the engine speed and the engine load are greater than respective thresholds thereof during a regeneration procedure of the SCRF;
    determining the variable period of aperture of the low pressure EGR valve based on a threshold function of the ratio between the SCRF inlet temperature and a predefined maximum temperature of the low pressure EGR valve;
    intermittently changing a size of the flow aperture at the variable period in the low pressure EGR valve during the regeneration procedure when the enabling condition is satisfied by opening the low pressure EGR valve for constant periods of time and opening the low pressure EGR valve to a constant percentage of aperture, for a period of time as a function of an SCRF inlet temperature;

opening the low pressure EGR valve when the enabling condition is satisfied if a urea injection is not performed during the regeneration procedure; and terminating the variable period of aperture of the low pressure EGR valve when the ratio between the SCRF inlet temperature and a predefined maximum temperature of the low pressure EGR when the ratio between the SCRF inlet temperature and a predefined maximum temperature of the low pressure EGR valve differs from the threshold function by less than a predefined amount.

* * * * *